United States Patent [19]

Knutsson et al.

[11] Patent Number: 4,747,151

[45] Date of Patent: May 24, 1988

[54] APPARATUS FOR DETERMINING THE DEGREE OF VARIATION OF A FEATURE IN A REGION OF AN IMAGE THAT IS DIVIDED INTO DISCRETE PICTURE ELEMENTS

[75] Inventors: Hans Knutsson; Gösta Granlund, both of Linköping, Sweden

[73] Assignee: Context Vision AB, Linkoping, Sweden

[21] Appl. No.: 865,350

[22] Filed: May 21, 1986

[30] Foreign Application Priority Data

May 23, 1985 [SE] Sweden .............................. 8502569

[51] Int. Cl.$^4$ ............................................. G06K 9/48
[52] U.S. Cl. ...................................... 382/21; 382/22; 382/41
[58] Field of Search ...................... 382/41, 50, 51, 22, 382/21, 56

[56] References Cited

U.S. PATENT DOCUMENTS

| | | | |
|---|---|---|---|
| 3,979,722 | 9/1976 | Sahoe ................................... | 382/21 |
| 4,074,231 | 2/1978 | Yajima et al. ........................ | 382/54 |
| 4,206,441 | 6/1980 | Kondo .................................. | 382/21 |
| 4,361,830 | 11/1982 | Honma et al. ....................... | 382/22 |
| 4,509,195 | 4/1985 | Nadler .................................. | 382/41 |
| 4,618,989 | 10/1986 | Tsuhune et al. ..................... | 382/41 |
| 4,644,583 | 2/1987 | Watanabe et al. ................... | 382/27 |

OTHER PUBLICATIONS

Reprinted from Proceedings of the IEEE Computer Society Conference on Pattern Recognition and Image Processing, PRIP 82, Las Vegas, Jun. 1982. "A Consistence Operation for Line and Curve Enhancement"—Martin Hedlund et al. pp. 1–4.

Primary Examiner—Leo H. Boudreau
Assistant Examiner—Joseph Mancuso
Attorney, Agent, or Firm—Witherspoon & Hargest

[57] ABSTRACT

The invention concerns an apparatus for determining the degree of variation of a feature in a region of an image that is divided into discrete picture elements, the feature being represented by complex valued signals, one for each picture element, the signal phase representing the feature class and the signal magnitude representing the certainty in the feature assertion. The apparatus includes a unit (3) for providing the complex valued signals (8) within the region and complex valued multiplication factor signals (9) corresponding to the complex valued signals. In a first summation unit (4), a first sum signal is generated by the magnitude products of the signals (8) and corresponding multiplication factor signals (9), and a second sum signal is generated by the complex valued scalar products of the signals (8) and corresponding complex conjugate of the multiplication factor signals. In a second summation unit (5), a third sum signal is generated by the signals (8) that are weighted with the magnitude of corresponding multiplication factor signals (9), and a fourth sum signal is generated by the complex conjugate of the multiplication factor signals (9) weighted with a magnitude of corresponding signals (8). A norming unit (6) is provided for norming the output signals from the summation units in a predetermined way (FIG. 2).

11 Claims, 4 Drawing Sheets

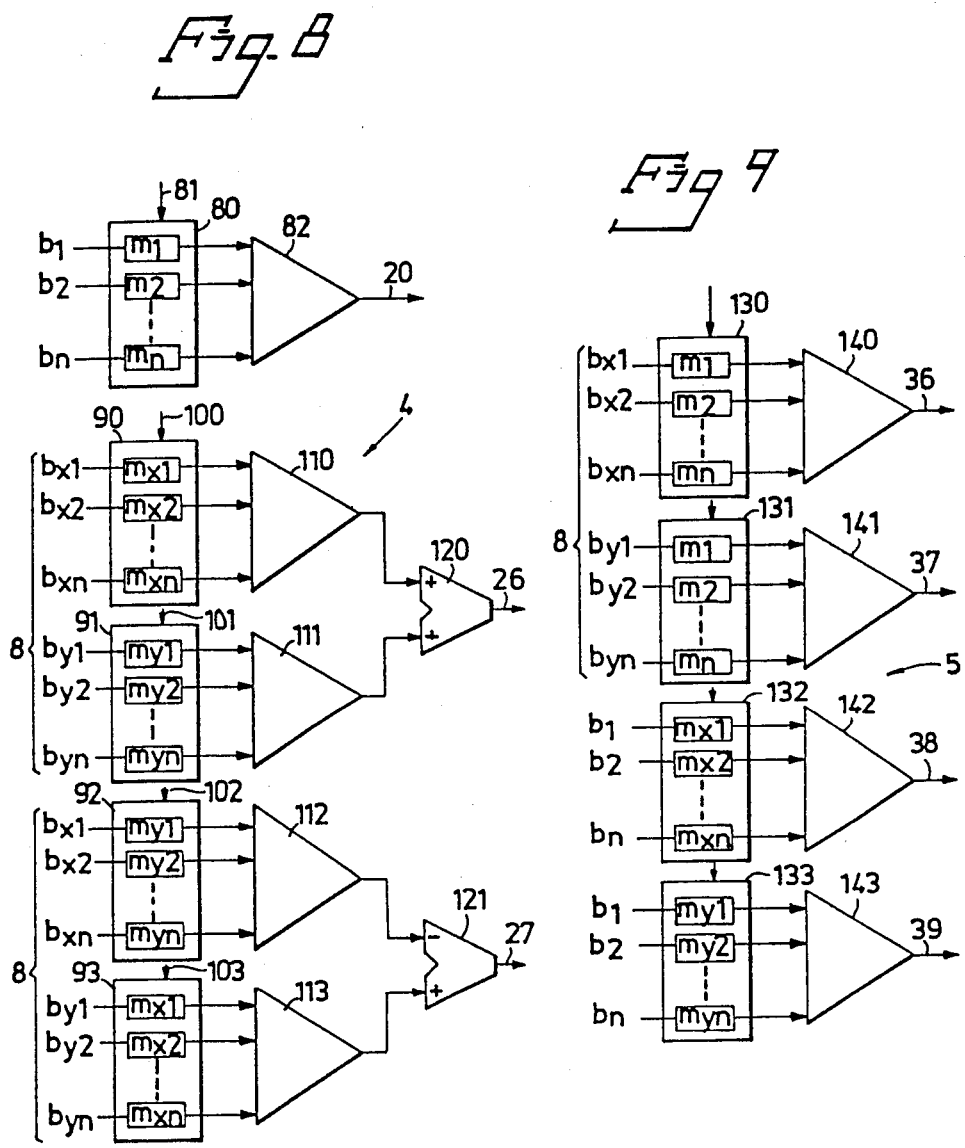

APPARATUS FOR DETERMINING THE DEGREE OF VARIATION OF A FEATURE IN A REGION OF AN IMAGE THAT IS DIVIDED INTO DISCRETE PICTURE ELEMENTS

The present invention concerns an apparatus for detecting fast and reliably the degree of variation of a feature in a region of an image that is divided into discrete picture elements.

BACKGROUND OF THE INVENTION

When interpeting the contents of images the detection of regions with homogeneity in characterizing features is an important step of the analysis. These regions are typically characterized in that one or several features within said regions are relatively constant or vary in a continuous and predictable way. Such continuously varying features may for instance be the curvature of lines and edges of an image. The feature could also be a matter of gradual shadings of the lighting of an image or the variation in the resolution of details as a function of the distance in a perspective image. Other characterizing features can also be detected.

On on-going problem has been that the characterizing of the variation is especially sensitive to noise. It has therefore been difficult to distinguish between low level noise in the image and characterizing features that show a stable variation. Attempts to overcome this problem have centered around efforts in areas relating to computerized image analysis and in particular to methods which have been implemented by means of a program for use with a general purpose computer. However, such methods have been inherently slow. The present invention concerns an apparatus by means of which with high speed and reliability it is possible to distinguish regions that have an even, continuous and predetermined variation of a feature from those regions that show an uneven, random variation.

SUMMARY OF THE INVENTION

The present invention thus discloses an apparatus that provides such a detection of the degree of variation of a feature in a region of an image that is divided into discrete picture elements.

The features characterizing the invention will appear from the accompanying patent claims.

It has proven that such an apparatus with the special applications referred to herein, can be thousands of times faster than a general computer.

The invention will be further described below in regard to an apparatus for the examination of a local region of an image that is divided into discrete picture elements. The values of the picture elements can be represented in either digital or analog form, depending on the implementation of the system. A complete system for the examination of a whole image can either contain a number of such units working in parallel with different sub-regions of the image or one single unit that successively analyses each sub-region of the image. These sub-regions can partially overlap each other. It is noted that the features to be observed are represented in the form of complex valued signals or two dimensional vectors, one for each discrete picture element. These signals or vectors represent one feature, for example, dominant orientation. Each vector is of such a nature that its direction or phase component describes the feature type, such as the dominant orientation of a structure in the image, while the length or magnitude component of the vector represents the certainty in the assertion of this direction. For example, in the case of orientation, the feature class of a vertical line would correspond to an horizontal right hand vector arrow, the feature class of an horizontal line would correspond to an horizontal left hand vector arrow, and the feature class of lines at forty five degrees would correspond to respective vector arrows pointing upwards and downwards, as the case may be, the length of the arrows representing the assertion of the feature class or the certainty. This vector representation of the image can be obtained for example through the conversion of the original image of which each discrete picture element can be allocated a grey scale level or an intensity level combined with a color code according to the principles disclosed in the "IEEE TRANSACTIONS ON COMMUNICATIONS", VOL COM-31, No. 3, Mar. 1983, pp. 388–406.

More particularly, in the image processing of a collection of discrete picture elements which represent a region of an image, an apparatus is provided including means for accessing actual complex valued signals from said collection, one for each of the discrete picture elements, each of said actual complex valued signals having a phase which describes the feature type and a magnitude which describes the certainty in the feature assertion, the actual complex valued signals representing the feature. Means are also provided for accessing a corresponding complex valued multiplication factor signal for each discrete picture element in the collection, each of the complex valued multiplication factor signals having a phase and a magnitude, the complex valued multiplication factor signals collectively forming a mask which represents a predetermined, idealized variation of the feature in the region. In the apparatus, means are coupled to each of the accessing means for receiving and processing the actual complex valued signals and the complex valued multiplication factor signals to measure the correspondence between the collection of complex valued signals in the region, and the mask, and for generating a complex valued output signal which characterizes the degree of variation of the feature within the region of the image.

The apparatus, by means of which the present invention solves the above indicated problems, can be characterized as follows. One or several units provide image data in the form of complex valued signals within the viewed region and complex valued multiplication factor signals that describe the predetermined degree of variation for the corresponding region. A first summation unit correlates the vectors within the viewed region in a predetermined way to the complex valued multiplication factor signals, also referred to herein as multiplication factors. A second summation unit sums up current complex valued image data and multiplication factors in a predetermined way. The unit then norms the output signals from the first summation unit and the second summation unit, respectively, in a predetermined way. The complex valued output signal, which thus is obtained characterizes the correspondence between the degree of variation determined by the multiplication factors and the actual variation of the feature within the detected region. The phase of the complex valued output signal constitutes a qualitative assertion about the feature within the region, while the magnitude of the signal constitutes a measure of the certainty in the assertion, that is, the greater the magnitude, the more certain the assertion.

BRIEF DESCRIPTION OF THE DRAWING

The invention will be further described below with reference to the accompanying drawing, in which:

FIGS. 8-9 shows parts of alternative, analog embodiments of the present invention.

DESCRIPTION OF THE PREFERRED EMBODIMENT.

Figure 1:
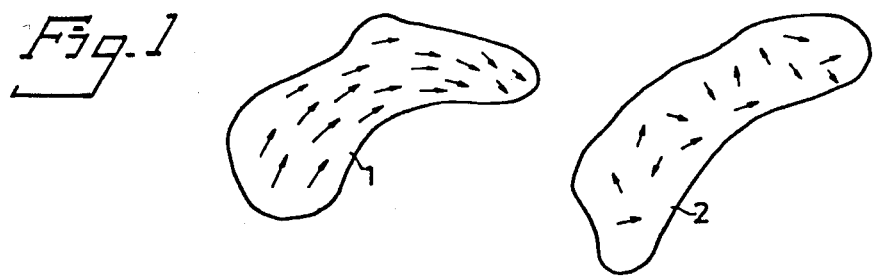
FIG. 1 illustrates the problem situation in question.

FIG. 1 illustrates the current problem situation. A region 1 with an evenly varying feature, representing for instance a certain structure orientation within the region, is characterized by complex valued signals or vectors with a direction that varies in a continuous way. An area 2 with a randomly varying or a non-homogeneous feature, means that the characterizing vectors have an orientation that varies in a noisy way. The problem situation is such that it is desirable, in a quick and reliable way, to be able to distinguish regions of type 1 from regions of type 2. It is thus desirable to be able to measure the degree of variation of a feature within a region around a picture element.

Figure 2:
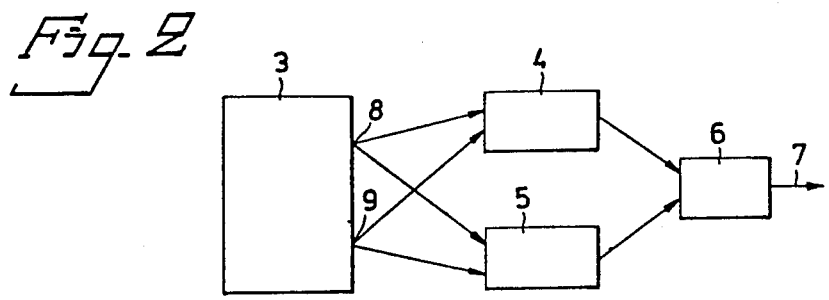
FIG. 2 shows a block diagram of the apparatus according to the present invention.

FIG. 2 shows a block diagram of an apparatus according to the present invention. The figure shows means in the form of unit 3 that accesses complex valued multiplication factor signals as well as image data in the form of complex valued signals for a region corresponding to a sub region or a "window" of an image, which is converted according to the above, within which region a measurement is to be carried out. Typically such a region contains 11×11 two dimensional vectors. The values of the vector components within this region are detected by two different receiving and processing means in the form of units 4 and 5. The output results from these two units are then compared in receiving and processing means in the form of a norming unit 6, where a normed result is obtained. This norming unit 6 delivers a complex valued signal 7 that characterizes the degree of variation of the feature within the region in question.

An embodiment of the apparatus according to FIG. 2 will now be described with reference to FIGS. 3-6.

Figure 3:
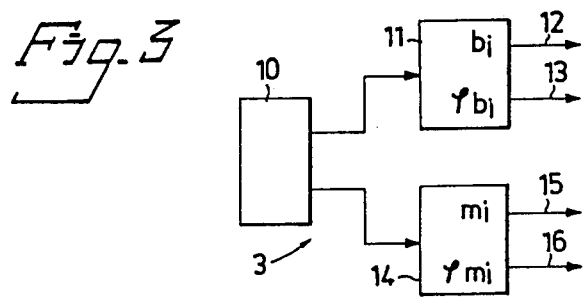
FIG. 3 shows a more detailed block diagram of an addressing unit with memories for picture data and multiplication factors.

FIG. 3 shows more in detail the unit 3 of FIG. 2 for accessing complex valued multiplication factor signals and image data in the form of complex valued signals for the viewed region. It is here assumed that the different complex valued signals or the vectors occurring within one neighborhood around the "measuring point" of the image, the signals 8, as well as the complex valued multiplication factor signals, the signals 9, are represented by a magnitude and phase; that is, the signals are in polar format. In a digital representation the magnitude, for example, can be represented by an integral number between 0 and 255; that is, by one byte. In the same way, the phase can also be represented by one byte. Each discrete picture element will therefore in a memory be allocated two bytes which represent the signal of the picture element. If another kind of digital resolution is desired, other storage allocations are of course conceivable. The data can also be represented in analog form such as voltage or current. An address generator 10 accesses from an image data memory 11 current vector values in the form of complex valued signals 8 for a neighborhood around the measuring point in the form of a magnitude signal 12 and a phase signal 13. The address generator 10 also provides a corresponding collection of complex valued multiplication factor signals 9 in the form of a magnitude signal 15 and a phase signal 16 from a coefficient memory 14. The units 10, 11 and 14 are each well known in the art and are not objectives of this invention.

Thus, corresponding to each discrete picture element in the viewed region of the image are an actual complex valued signal or vector, as well as a complex valued multiplication factor signal. The complex valued multiplication factor signals form together a "mask" that describes a predetermined, idealized variation of the current feature within the region. Examples of such masks are shown in FIG. 7. The purpose of the invention is to measure the correspondence between the actual collection of vectors and this hypothetical, idealized variation.

Figure 4:
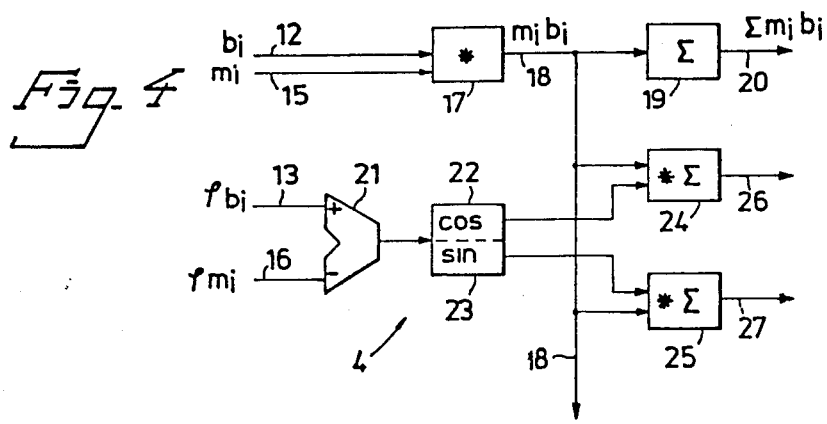
FIG. 4 shows a more detailed block diagram of the first summation unit for correlative calculation of FIG. 2.

FIG. 4 shows more in detail the structure of the unit for correlating the complex valued signals 8 within the viewed region to the complex valued multiplication factor signals 9. The magnitude signal 12 of the image data memory 11 and the magnitude signal 15 of the coefficient memory 14 are passed to a multiplicator 17. The resulting product components 18 are summed in a summator 19, and the resulting product sum for the viewed neighborhood is obtained at output 20.

The phase signal 13 of the image data memory 11 and the phase signal 16 of the coefficient memory 14 are passed to an input and an inverting input, respectively, of an adder 21. The obtained phase difference is then taken to a cosine generator one type of which is referred to herein as a look up table 22 for cosine and a sine generator one type of which is referred to herein as a look up table 23 for sine. The values obtained through this procedure are each supplied to a multiplying summator 24 and 25, respectively, where they are multiplied by the signal 18, followed by a summation of the result. This provides product sums at outputs 26, 27 for the real and imaginary part, respectively, for the viewed neighborhood.

Figure 5:
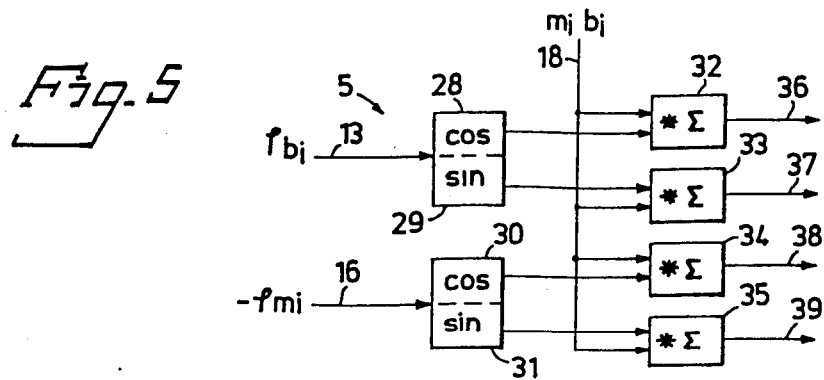
FIG. 5 shows a more detailed block diagram of the second summation unit for summing up the complex valued signals of FIG. 2.

FIG. 5 shows more in detail the structure of unit 5 of FIG. 2 for the summation of current complex valued image signals within the neighborhood as well as complex valued multiplication factor signals. The phase signal 13 of the image data memory 11 and the sign inverted phase signal 16 of the coefficient memory 14 are each taken to a cosine and sine generator, such as for example, a corresponding look up table 28 and 30, respectively, for cosine and each to a corresponding look up table 29 and 31, respectively, for sine. The thus obtained values are each passed to a multiplying summator 32, 33, 34 and 35. The magnitude product 18 is present as an additional input signal to each multiplying summator. This provides product sums for the real part at outputs 36 and 38, respectively, and the imaginary part at outputs 37 and 39, respectively, for the viewed neighborhood.

Figure 6:
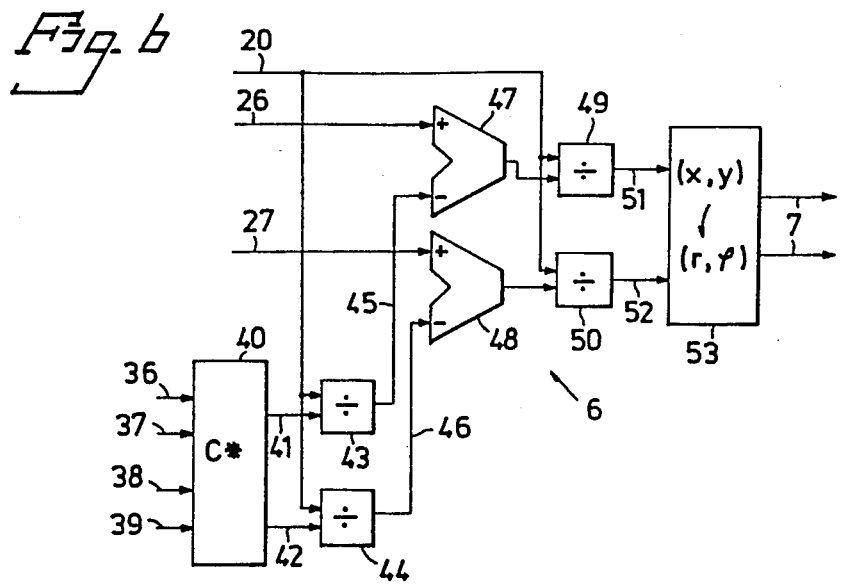
FIG. 6 shows a more detailed illustration of the norming unit of FIG. 2.

FIG. 6 shows more in detail a means coupled to the first and second summation units for norming the signals received therefrom. For example, FIG. 6 depicts the norming unit 6 of FIG. 2. The earlier obtained product sums 36, 37 and 38, 39, respectively, for the viewed neighborhood are passed to a multiplying means or unit 40 for a complex valued multiplication of these sums. The real part 41 and the imaginary part 42 of the resulting product are each brought to a dividing unit 43 and 44, respectively, where they are divided by the earlier obtained magnitude product sum 20, to form the values 45 and 46, respectively. These values are subtracted from the earlier obtained product sums 26 and 27 in two adders 47 and 48, respectively, each provided with a sign inverting input. Subsequently, the obtained values are divided in dividing units 49 and 50 by the signal 20 for forming the desired final output signals 51 and 52, respectively. These can then, if desirable, be brought to polar format by means of a rectangular/polar converter 53.

FIG. 7 shows two examples of the multiplication factors that are useful in conjunction with the present invention. Since it has been assumed that the viewed region of the image is formed by a set of 11×11 picture elements (of course, also other sizes are conceivable) the multiplication factors as well form a collection of 11×11 complex valued signals, each factor corresponding to one picture vector within the region.

Figure 7A:
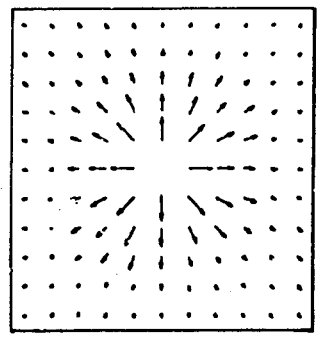
FIG. 7 shows two examples of "masks" describing two different predetermined variation degrees and including said multiplication factors.

FIG. 7a shows a "divergence" mask which is suitable for detecting, for example, end points on lines and corners in the image.

Figure 7B:
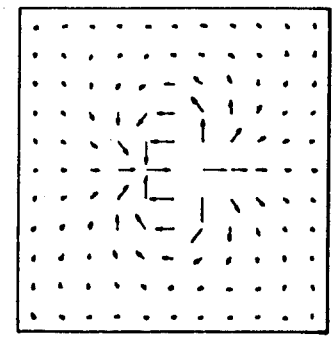

FIG. 7b shows a "rotary" mask which is suitable for detecting, for example, radial and circular structures in the image.

Thus, it is understood that the interpretation of the measuring result depends on which mask of complex valued multiplication factor signals was used in the measurement.

The earlier described implementation primarily relates to digital technique, whereby the vectors of the picture elements are represented in digital form. However, the indicated functions can advantageously also be performed in an analog technique. Those structures that become specific for this form of implementation are provided in FIGS. 8 and 9.

FIG. 8 shows an analog variant of the unit 4, and FIG. 9 shows an analog variant of unit 5.

According to FIG. 8 the first summation unit 4 sums all the real parts and imaginary parts of the signals 8 multiplied by respective multiplication factors that are implemented by implementing means such as resistor networks 90–93 or multiplying D/A converters that are controlled by digital control signals 100–103. Then the signals are passed further to summators 110–113, for instance in the form of feed back operational amplifiers. It is to be noticed that the whole neighborhood around the measuring point (n=11×11=121, under the same conditions as above) is processed in parallel, in this embodiment. Multiplications in the networks 90–93 can be regarded as a reflection of Ohm's law. The advantage with multiplying D/A converters is that the resulting resistance value corresponding to the multiplication factor is adjustable by a digital control signal. The output signals from the summators 110–113 are summed in adders 120, 121 for obtaining signals corresponding to the signals 26, 27.

The magnitude product sum 20 is obtained in a similar way by means of the magnitude signals for the vectors and the multiplication factors for the neighborhood, respectively, the latter being implemented by implementing means such as a network 80 of resistors or multiplying D/A converters. The product signals are summed in a summator 82 for obtaining the signal 20.

According to FIG. 9 the second summation unit 5 sums all the real and imaginary parts, respectively, of the signals 8 with the magnitudes of the multiplication factors implemented by implementing means such as networks 130, 131 of resistors or multiplying D/A converters controlled by control signals. The output signals from respective networks are summed in summators 140, 141. In a similar way, the magnitude signals of the vectors are summed, the vectors being multiplied by the real and imaginary parts, respectively, of the multiplication factors that are implemented by implementing means such as networks 132, 133 of resistors or multiplying D/A converters controlled by control signals. The signals are then each passed further to a summator 142 and 143, respectively, the latter being provided with inverting inputs. From the summators 140–143 the earlier mentioned signals 36–39 are obtained.

In the embodiment according to FIGS. 8 and 9 the signals are assumed to be accessible as real and imaginary parts, as well as magnitude. This provides a particularly simple structure of the apparatus. Thus, it can be desirable to store the image signals in rectangular form as well as in polar form, or besides rectangular form, at least also store the vector magnitudes. The resulting additional storage requirement is compensated by the simplified structure of the apparatus. This is in particular applicable if the whole image or greater parts of the image are to be examined in one step by a plurality of apparatus that works in parallel.

Figure 10:
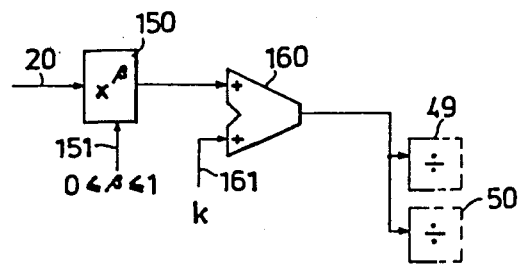
FIG. 10 shows some further developments of the invention.

Some further developments of the invention are shown in FIG. 10 for the provision of a somewhat more general apparatus.

Sometimes it is desirable to be able to vary the norming. In the above described embodiments the norming is maximized, and the output signal is independent of the energy of the input signal. In the purpose of further reducing the noise sensitivity of the measurement, a norming varying means or unit 150 can be provided for the dividing units 49, 50 in the norming unit 6. This unit raises the signal 20 to an exponent between 0 and 1. The size of the exponent is preferably adjusted by a control signal 151. The special case, in which the exponent is 0, can also be implemented by omitting the unit 150 and dividing units 49, 50. The special case, in which the exponent is 1, is equivalent to the embodiment of FIG. 6. Thus, in this case the unit 150 can be omitted.

Figure 11:
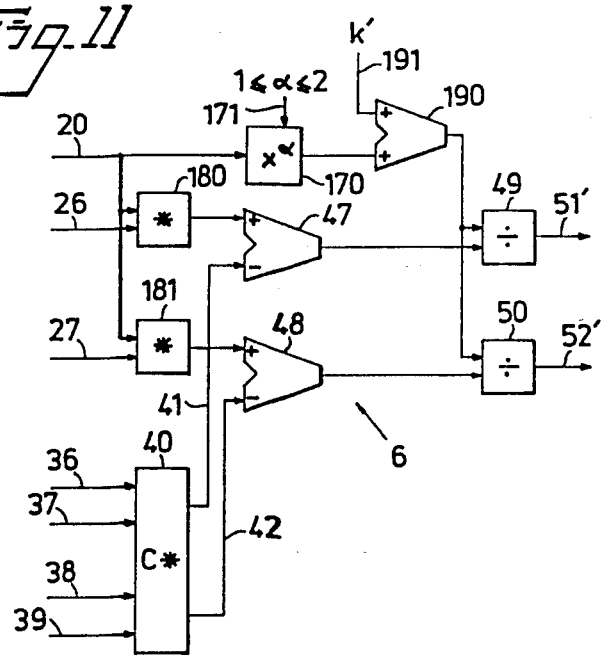
FIG. 11 shows an alternative embodiment of the norming unit of FIG. 2.

Yet another generalization of the invention is obtained if an adder 160 to the signal 20, which is possibly processed according to the preceding paragraph, adds a reference or base level 161. This is in particular suitable in cases with low input levels since these levels otherwise can render a misleading result in a normal norming. In the special case, when the reference level is 0, the adder 160 can be omitted and the embodiment according to FIG. 6 is recovered. FIG. 11 shows an alternative embodiment of the norming unit 6 of FIG. 2. Since this embodiment in greater parts resembles the embodiment of FIG. 6, the same reference designations have been used, when possible. In this embodiment the dividing units 43, 44 of FIG. 6 have been omitted. Instead a pair of multiplicators 180, 181 have been connected in front of the adders 47, 48. There, the signals 26, 27 are multipled by the signal 20 before they are passed to the adders. Another difference is that the signals 41, 42 now directly are passed to the adders 47, 48. These adders are, as before, each connected to one of the inputs of a corresponding dividing unit 49, 50. Before the signal 20 is supplied to the second input of these dividing units, it can, in an analogous way to FIG. 10, be supplied to a unit 170 that raises it by a controllable exponent 171, which in this case is between 1 and 2. In the special case when the exponent equals 2, the output signal 51', 52' of the norming unit will be identical with the output signal from unit 6 of FIG. 6. In the other extreme case, when the exponent equals 1, the unit 170 and the units 49, 50 can be omitted. As in FIG. 10, a reference signal 191 in an adder 190 can here as well be added to the output signal from unit 170.

In the embodiments according to FIGS. 10 and 11 certain intervals have been indicated for the exponents, by way of an example. It is, however, understood that the invention is not confined to exactly these intervals, and that also other intervals are conceivable.

A person skilled in the art realizes that these described embodiments of the invention can be varied and modified in several ways within the frame of the basic idea of the invention which is described in the accompanying patent claims.

We claim:

1. Apparatus comprising:
   first means for recording a first image of a physical object or scene and dividing said first image into discrete picture elements;
   second means for transforming said first image which has been divided into discrete picture elements into a vector representation, said vector representation comprising complex valued signals,
   third means for accessing said complex valued signals from a plurality of picture elements which collectively form a plurality of overlapping regions of a vector valued image, one complex valued signal for each picture element of said plurality of picture elements, each of said complex valued signals having a phase which describes feature class and a magnitude which describes certainty in feature assertion, said complex valued signals representing said feature;
   fourth means for accessing a corresponding complex valued multiplication factor signal for each picture element in said plurality of picture elements, each of said complex valued multiplication factor signals having a phase and a magnitude, the complex valued multiplication factor signals, for each region of said plurality of overlapping regions, collectively forming a mask which represents a predetermined idealized variation of said feature in a respective region of said plurality of overlapping regions; and,
   fifth means coupled to each of said third and fourth means for receiving and processing, for each region of said plurality of overlapping regions, said complex valued signals and said complex valued multiplication factor signals to measure, for each region of said plurality of overlapping regions, the correspondence between the collection of complex valued signal, for each region of said plurality of overlapping regions, which characterizes the degree of variation of said feature therein thereby producing a second image representing characterizing properties of a recorded image of said physical object or scene.

2. Apparatus according to claim 1 wherein said fifth means comprises:
   a first summation unit including a summator, a first multiplying summator and a second multiplying summator, a first multiplicator coupled to said summator and to said first and second multiplying summators, a first adder coupled to a first cosine generator and a first sine generator, said first cosine generator being coupled to said first multiplying summator and said first sine generator being coupled to said second multiplying generator, and wherein said magnitude of said complex valued signals and said magnitude of said coresponding complex valued multiplication factor signals, are received by said first multiplicator which outputs a resulting product components to said summator, and said first and second multiplying summators, said summator summing said resulting product components and outputting a first product sum signal, said phase of said complex valued signals being received by an input of said first adder and said phase of said corresponding complex valued multiplication factor signals being received by an inverting input of said first adder, the phase difference generated by said first adder being outputted to said first cosine generator and said first sine generator which generate a corresponding first cosine signal and first sine signal which are outputted to said first multiplying summator and said second multiplying summator, respectively, where said corresponding first cosine and first sine signals are multiplied by said resulting product components to produce second and third product sum signals which are outputted by said first and second multiplying summator, respectively;
   a second summation unit including a second cosine generator and a second sine generator coupled to a third multiplying summator and fourth multiplying summator, respectively, and a third cosine generator and a third sine generator coupled to a fifth multiplying summator and sixth multiplying summator, respectively, said multiplicator being coupled to said third, fourth, fifth and sixth multiplying summators and said resulting product components being inputted to said third, fourth, fifth and sixth multiplying summators, said phase of said complex valued signals being received by said second cosine generator and said second sine generator which generates a corresponding second cosine and sine signal which are outputted to said third and fourth multiplying summators, respectively, where said corresponding second cosine and second sine signals are multiplied by said resulting product components to produce fourth and fifth product sum signals which are outputted by said third and fourth multiplying summator, respectively, the sign inverted phase of said corresponding complex valued multiplication factor signals being received by said third cosine generator and said third sine generator which generates a corresponding third cosine and third sine signal which are outputted to said fifth and sixth multiplying summators, respectively, where said corresponding third cosine and third sine signals are multiplied by said resulting product components to produce sixth and seventh product sum signals which are outputted by said fifth and sixth multiplying summator, respectively; and, means coupled to said first summation unit and said second summation unit for norming said product sum signals.

3. Apparatus according to claim 2 wherein said norming means comprises a multiplying means coupled to a first dividing unit and a second dividing unit which are coupled to a second adder and a third adder, respectively, the second adder being coupled to a third dividing unit and the third adder being coupled to a fourth dividing unit, said third and fourth dividing units being coupled to a converter, said first product sum signals being fed to said first, second, third and fourth dividing units, said second product sum signals being fed to an input of said second adder, and said third product sum signals being fed to an input of said third adder, said fourth, fifth, sixth and seventh product sum signals being fed to said multiplying means for complex valued multiplication, the real part of the resulting product and the imaginary part of the resulting product being generated to said first and second dividing units, respectively, for dividing by said first product sum signal, to form a first value signal and a second value signal which are generated to sign inverting inputs of said second and third adders, respectively, for subtracting from said second and third product sum signals, respectively, the resulting signals being generated to said third and fourth dividing units, respectively, to be divided by said first product sum signals and then outputted by said third and fourth dividing units to said converter for converting into polar format and outputted by said converter in the form of said complex valued output signals.

4. Apparatus according to claim 3 further including means for varying the norming, said first product sum signals being fed to the norming varying means wherein said first product sum signals are raised to an exponent between 0 and 1, the size of said exponent being adjusted by a control signal which is also fed to the norming varying means, said first product sum signals which have been raised to said exponent then being fed to said third and fourth dividing units.

5. Apparatus according to claim 4 further including a fourth adder having a reference level signal fed thereto, said first product sum signals which have been raised to said exponent being fed to said fourth adder and said reference level signal being added thereto, the output from said fourth adder then being fed to said third and fourth dividing units.

6. Apparatus according to claim 2 wherein said norming means comprises a multiplying means coupled to a second adder and a third adder which are coupled to a first dividing unit and a second dividing unit, respsectively, and including a second multiplicator and third multiplicator coupled to said second and third adder, respectively, said first product sum signals being fed to said second and third multiplicator and to said first and second dividing units, said fourth, fifth, sixth and seventh product sum signals being fed to said multiplying means for complex valued multiplication, the imaginary part of the resulting product and the real part of the resulting product being generated to sign inverting inputs of said second and third adders, respectively, said second and third product sum signals being fed to said second and third multiplicators, respectively, multiplied by said first product sum signal, and outputted to inputs of said second and third adders, respectively, where said real part and said imaginary part, respectively, are subtracted, the resulting signals from said second and third adders being generated to said first and second dividing units, respectively, to be divided by said first product sum signals and then outputted by said first and second dividing units.

7. Apparatus according to claim 6 wherein said norming means further includes means for varying the norming, said first product sum signal being fed to the norming varying means wherein said first product sum signals are raised to an exponent between 1 and 2, the size of said exponent being adjusted by a control signal which is also fed to the norming varying means, said first product sum signals which have been raised to said exponent then being fed to said first and second dividing units.

8. Apparatus according to claim 7 including a fourth adder having a reference level signal fed thereto, said first product sum signals which have been raised to said exponent being fed to said fourth adder and said reference level signal being added thereto, the output from said fourth adder then being fed to said first and second dividing units.

9. Apparatus according to claim 1 wherein said fifth means includes for receiving and processing a first implementing means coupled to a first summator, and wherein said magnitude signals of said complex valued signals are received by said implementing means which multiplies said magnitude signals of said complex valued signals by said corresponding magnitudes of said complex valued multiplication factor signals to produce first output signals which are fed to said first summator which sums said first output signals and generates a first product sum signal.

10. Apparatus according to claim 9 wherein said third means further includes for receiving and processing a second implementing means coupled to a second summator, a third implementing means coupled to a third summator, a fourth implementing means coupled to a fourth summator, and a fifth implementing means coupled to a fourth summator, said second and third summators being coupled to a first adder, said fourth summator being coupled to the inverting input of a second adder, and said fifth summator being coupled to a non-inverting input of said second adder, and wherein real parts of said complex valued signals are received by said second and fourth implementing means and imaginary parts of said complex valued signals are received by said third and fifth implementing means, said second and third implementing means multiplying said real parts and said imaginary parts, respectively, of said complex valued signals by corresponding real parts and imaginary parts, respectively, of said complex valued multiplication factor signals to produce second output signals and third output signals, respectively, which are fed to said second and third summator, respectively, which sum said second and third output signals, respectively, and generate a first and second intermediate sum signal, respectively, said first and second intermediate sum signals being fed to said first adder which sums said second and third intermediate sum signals and generates a second product sum signal, said fourth and fifth implementing means multiplying said real parts and said imaginary parts, respectively, of said complex valued signals by corresponding imaginary and real parts, respectively, of said complex valued multiplication factor signals to produce fourth and fifth output signals, respectively, which are fed to said fourth and fifth summator, respectively, which sum said fourth and fifth output signals, respectively, and generates a third and fourth intermediate sum signal, respectively, said third intermediate sum signal being fed to said inverting input of said second adder and said fourth intermediate sum signal being fed to said non-inverting input of said second adder, said second adder summing said third and fourth intermediate sum signals and generating a third product sum signal.

11. Apparatus according to claim 10 wherein said fifth means further includes for receiving and processing sixth, seventh, eighth and ninth implementing means coupled to sixth, seventh, eighth and ninth summators, respectively, and wherein real parts and imaginary parts of said complex valued signals are received by said sixth and seventh implementing means, respectively, which multiplies said real parts and said imaginary parts by corresponding magnitudes of said complex valued multiplication factor signals, respectively, to produce sixth and seventh output signals, respectively, which are fed to said sixth and seventh summator, respectively, which sums said sixth and seventh output signals, respectively, and generates fourth and fifth sum signals, respectively, and wherein said magnitude of said complex valued signals are fed to said eighth and ninth implementing means, which multiplies said magnitude of said complex valued signals by real parts and imaginary parts of said complex valued multiplication signals, respectively, to produce eighth and ninth output signals, respectively, which are fed to said eighth and ninth summator, respectively, which sums said eighth and ninth output signals, respectively, and generates sixth and seventh sum signals, respectively.

* * * * *